(12) United States Patent
Eo et al.

(10) Patent No.: US 10,641,359 B2
(45) Date of Patent: May 5, 2020

(54) TRANSMISSION FOR VEHICLE

(71) Applicant: Hyundai Motor Company, Seoul (KR)

(72) Inventors: Soon Ki Eo, Ansan-si (KR); Woo Churl Son, Seongnam-si (KR); Ma Ru Kang, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 825 days.

(21) Appl. No.: 15/350,402

(22) Filed: Nov. 14, 2016

(65) Prior Publication Data

US 2018/0031083 A1 Feb. 1, 2018

(30) Foreign Application Priority Data

Jul. 27, 2016 (KR) .................. 10-2016-0095147

(51) Int. Cl.
*F16H 3/10* (2006.01)
*F16H 3/093* (2006.01)
(Continued)

(52) U.S. Cl.
CPC ............. *F16H 3/093* (2013.01); *F16H 3/006* (2013.01); *F16H 3/10* (2013.01); *F16H 37/043* (2013.01);
(Continued)

(58) Field of Classification Search
CPC . F16H 3/093; F16H 3/006; F16H 3/10; F16H 37/043; F16H 2003/007
(Continued)

(56) References Cited

U.S. PATENT DOCUMENTS 4,576,063 A * 3/1986 Akashi .................... F16H 3/006
74/331
4,594,908 A * 6/1986 Akashi .................... F16H 3/10
74/331
(Continued)

FOREIGN PATENT DOCUMENTS

DE 10 2009 018 * 10/2010
JP H 8-188065 A 7/1996
(Continued)

OTHER PUBLICATIONS

Chinese Office Action dated Feb. 3, 2020 for Chinese Patent Application No. 201611043611.X.

*Primary Examiner* — William C Joyce
(74) *Attorney, Agent, or Firm* — Morgan, Lewis & Bockius LLP

(57) ABSTRACT

A transmission includes: a pre-engaging mechanism including a plurality of pre-engaging gear pairs engaged with a second input shaft, a first countershaft, and a second countershaft so that the pre-engaging gear pairs are appropriately selected by a clutch unit; a synchro-engaging mechanism including a plurality of synchro-engaging gear pairs engaged with a third input shaft, the first countershaft, and the second countershaft so that the synchro-engaging gear pairs are appropriately selected by a clutch unit; a one-way clutch positioned on a corresponding power transmission path so that power transmitted through the first input shaft from the engine is transmitted only to the third input shaft; and a main shifting mechanism including a plurality of main gear pairs engaged with the first countershaft, the second countershaft, and an output shaft so that the main gear pairs are appropriately selected by a clutch.

11 Claims, 3 Drawing Sheets

(51) Int. Cl.
*F16H 37/04* (2006.01)
*F16H 3/00* (2006.01)

(52) U.S. Cl.
CPC .............. *F16H 2003/007* (2013.01); *F16H 2200/0039* (2013.01); *F16H 2200/0078* (2013.01)

(58) Field of Classification Search
USPC .......................................................... 74/331
See application file for complete search history.

(56) References Cited

U.S. PATENT DOCUMENTS

| | | |
|---|---|---|
| 6,886,424 B2 | 5/2005 | Janson et al. |
| 7,107,866 B2 | 9/2006 | Baldwin et al. |
| 9,212,726 B2 * | 12/2015 | Eo ............................ F16H 3/006 |
| 2013/0296108 A1 | 11/2013 | Ortmann et al. |

FOREIGN PATENT DOCUMENTS

| | | |
|---|---|---|
| JP | 2005-076875 | 3/2005 |
| JP | 2010-162923 A | 7/2010 |
| KR | 10-2009-0132758 A | 12/2009 |
| KR | 10-2016-0035636 A | 4/2016 |

* cited by examiner

FIG. 2

● Position of clutch unit for shifting to current gear stage
○ Position of clutch unit operated in process of shifting to current gear stage

[Up-Shift]

| Gear stage | CL | Sa1 | | Sa2 | | | | Sb1 | | Sb2 | | | S1&3 | | | S2&4 | | |
|---|---|---|---|---|---|---|---|---|---|---|---|---|---|---|---|---|---|---|
| | | Ga1-1 | N | Ga2-1 | Ga1-2 | N | Ga2-2 | Gb1-1 | N | Gb1-2 | N | Gb2-2 | G1 | N | G3 | G2 | N | G4 |
| N | ● | | ● | | | ● | | | ● | | ● | | | ● | | | ● | |
| 1 | ● | ● | | | | ● | | | ● | | ● | | | ● | | | ● | |
| 2 | ● | ○ | ● | | ● | ○ | | ○ | ● | | ● | | ● | ● | | | ● | |
| 3 | ● | ● | ○ | | ○ | ● | | | ● | ○ | ● | | ○ | ○ | ● | ○ | ● | |

FIG. 3

[Down-Shift]

| Gear stage | CL | Sa1 | | Sa2 | | Sb1 | | Sb2 | | S1&3 | | | S2&4 | |
|---|---|---|---|---|---|---|---|---|---|---|---|---|---|---|
| | | Ga1-1 | Ga2-1 N | Ga1-2 | Ga2-2 N | Gb1-1 | Gb2-1 N | Gb1-2 | Gb2-2 N | G1 | N G3 | G2 | N | G4 |
| 3 | ● | ● | | | ● | | ● | | ● | | | ● | ● | | ● |
| 2 | ● | ○ | ● | ● | ○ | | ● | | ● | | ● | ○ | ● | ○ | ○ |
| 1 | ● | ● | ○ | ○ | ● | ○ | ● | ○ | ● | ● | ○ | | ● | ● |
| N | ● | | ● | | ● | | ● | | ● | | ● | | | ● | ● |

● Position of clutch unit for shifting to current gear stage
○ Position of clutch unit operated in process of shifting to current gear stage

TRANSMISSION FOR VEHICLE

CROSS REFERENCE TO RELATED APPLICATION

The present application claims priority to Korean Patent Application No. 10-2016-0095147, filed Jul. 27, 2016, the entire contents of which is incorporated herein for all purposes by this reference.

BACKGROUND OF THE INVENTION

Field of the Invention

The present invention provides a transmission for a vehicle, whereby the transmission reduces poor shifting that causes a phenomenon such as pulling of a vehicle during shifting.

Description of the Related Art

An automated manual transmission can provide convenience for a driver, similar to an automatic transmission, by providing automatic shifting by an actuator while the vehicle is driven, and can contribute to improving fuel efficiency of the vehicle while maintaining power transmission efficiency higher than an automatic transmission.

However, for an automated manual transmission based on a synchro-mesh type shifting mechanism, there is necessary a period where power from an engine is disconnected while automatic shifting is performed by an actuator that shifts gears, so torque is decreased and the shifting ability is deteriorated resulting in, for example, a backward pulling effect of the vehicle when shifting.

In order to solve these problems, a technology of selectively transmitting power from an engine to a shifting mechanism or an output shaft, depending on the driving states of the vehicle, by providing a planetary gear set between the engine and the shifting mechanism may have been proposed.

The foregoing is intended merely to aid in the understanding of the background of the present invention, and is not intended to mean that the present invention falls within the purview of the related art that is already known to those skilled in the art.

SUMMARY OF THE INVENTION

Various aspects of the present invention are directed to providing a transmission for the vehicle, whereby the transmission may have a simple structure and provides many shifting steps without disconnection during shifting which causes a phenomenon including pulling of the vehicle during shifting.

In an aspect of the present invention, there is provided a transmission for the vehicle, the transmission including: a first input shaft continuously receiving power from the engine; a second input shaft selectively receiving power from the engine through a clutch; a first countershaft and a second countershaft arranged in parallel with the second input shaft; a pre-engaging mechanism including a plurality of pre-engaging gear pairs engaged with the second input shaft, the first countershaft, and the second countershaft so that the pre-engaging gear pairs are appropriately selected by a clutch unit in accordance with a driving speed; a third input shaft arranged in parallel with the first countershaft and the second countershaft; a synchro-engaging mechanism including a plurality of synchro-engaging gear pairs engaged with the third input shaft, the first countershaft, and the second countershaft so that the synchro-engaging gear pairs are appropriately selected by a clutch unit in accordance with a driving speed; a one-way clutch disposed on a corresponding power transmission path so that power transmitted through the first input shaft from the engine is transmitted only to the third input shaft; and a main shifting mechanism including a plurality of main gear pairs engaged with the first countershaft, the second countershaft, and an output shaft so that the main gear pairs are appropriately selected by a clutch in accordance with a driving speed.

The first input shaft and the second input shaft may be coaxially arranged, the second input shaft may be a hollow shaft and the first input shaft may be inserted in the second input shaft, and the clutch may be disposed at a first end, which is relatively adjacent to the engine, of the second input shaft.

The pre-engaging gear pairs may include: a 1-1 pre-engaging gear pair and a 2-1 pre-engaging gear pair engaged with the second input shaft and the first countershaft; and a 1-2 pre-engaging gear pair and a 2-2 pre-engaging gear pair engaged with the second input shaft and the second countershaft, and the synchro-engaging gear pairs may include: a 1-1 synchro-engaging gear pair and a 2-1 synchro-engaging gear pair engaged with the first input shaft and the first countershaft; and a 1-2 synchro-engaging gear pair and a 2-2 synchro-engaging gear pair engaged with the first input shaft and the second countershaft.

The pre-engaging gear pairs and the synchro-engaging gear pairs may include gear pairs having same gear ratios.

The 1-1 pre-engaging gear pair, the 1-2 pre-engaging gear pair, the 1-1 synchro-engaging gear pair, and the 1-2 synchro-engaging gear pair may have a same gear ratio; and the 2-1 pre-engaging gear pair, the 2-2 pre-engaging gear pair, the 2-1 synchro-engaging gear pair, and the 2-2 synchro-engaging gear pair may have a same gear ratio.

The 1-1 pre-engaging gear pair, the 2-1 pre-engaging gear pair, the 1-1 synchro-engaging gear pair, and the 2-1 synchro-engaging gear pair may have a same gear ratio; and the 1-2 pre-engaging gear pair, the 2-2 pre-engaging gear pair, the 1-2 synchro-engaging gear pair, and the 2-2 synchro-engaging gear pair may have a same gear ratio.

The 1-1 pre-engaging gear pair and the 1-1 synchro-engaging gear pair may have a same gear ratio, the 1-2 pre-engaging gear pair and the 1-2 synchro-engaging gear pair may have a same gear ratio, the 2-1 pre-engaging gear pair and the 2-1 synchro-engaging gear pair may have a same gear ratio, and the 2-2 pre-engaging gear pair and the 2-2 synchro-engaging gear pair may have a same gear ratio.

The clutch unit of the pre-engaging mechanism may be disposed between a plurality of pre-engaging gear pairs and select an appropriate pre-engaging gear pair in accordance with a driving speed, and the clutch unit of the synchro-engaging mechanism may be disposed between a plurality of synchro-engaging gear pairs and select an appropriate synchro-engaging gear pair in accordance with a driving speed.

The first input shaft and the third shaft may be coaxially arranged, and the one-way clutch may be disposed on a power transmission path connected from the first input shaft to the third input shaft.

A power transmission member may be disposed at a second end of the first input shaft to face a first end of the third input shaft and the one-way clutch may be disposed between the power transmission member and the third input shaft.

Input gears of main gear pairs for odd-numbered gear stages or even-numbered gear stages may be disposed on the first countershaft, input gears of a second main gear pairs except for the input gears on the first countershaft may be disposed on the second countershaft, and output gears making pairs with the input gears on the first countershaft and the second countershaft may be disposed on the output shaft.

As described above, while shifting to a desired gear stage from the current gear stage is performed, the one-way clutch absorbs the difference in rotational speed due to the difference in gear ratio of the gear stages at the point of time when the torque from the synchro-engaging gear pairs is switched to the pre-engaging gear pairs, thereby preventing poor shifting that causes a phenomenon including pulling of the vehicle during shifting.

Further, the pre-engaging gear pairs and the synchro-engaging gear pairs have a plurality of stages having different gear ratios, whereby the number of gear stages that can be achieved by combination with the main gear pairs is greatly increased in proportion to the number of stages of the pre-engaging gear pairs and the synchro-engaging gear pairs. Accordingly, it is possible to achieve many gear stages from the transmission without largely increasing the entire length of the transmission.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a table showing a shifting operation for a gear stages during up-shifting by the transmission of the present invention; and FIG. 3 is a table showing a shifting operation for a gear stages during down-shifting by the transmission of the present invention.

Figure 1:
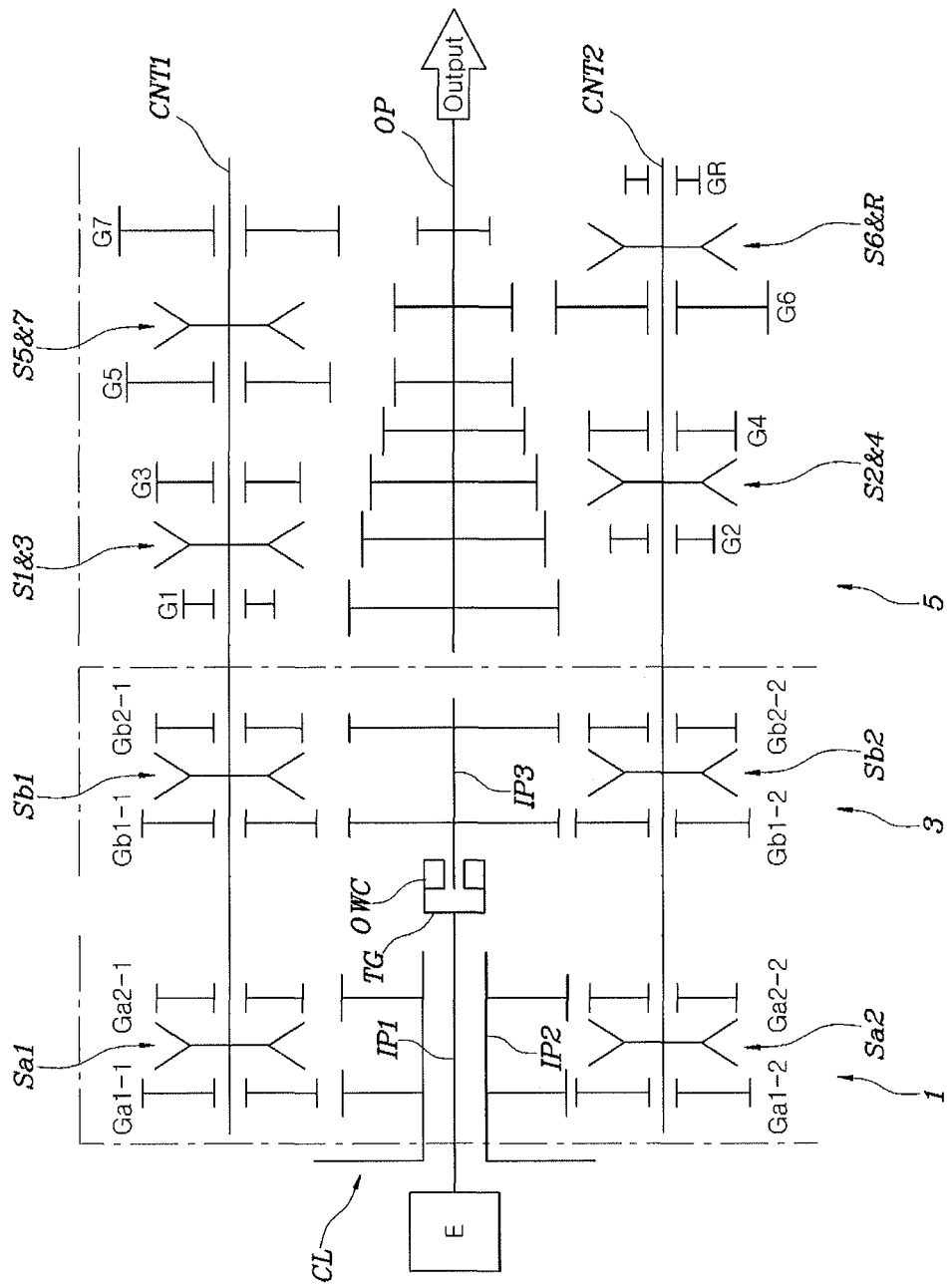
FIG. 1 is a diagram showing an exemplary configuration of a transmission for the vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will be described hereafter in detail with reference to the accompanying drawings.

A transmission for a vehicle according to an embodiment of the present invention may include a first input shaft IP1, a second input shaft IP2, a third input shaft IP3, a first countershaft CNT1, a second countershaft CNT2, a pre-engaging mechanism 1, a synchro-engaging mechanism 3, a one-way clutch OWC, and a main shifting mechanism 5.

Referring to FIGS. 1 and 2, in detail, the first input shaft IP1 is continuously rotated by power from an engine E.

The second input shaft IP2 is selectively rotated by power from the engine E with selective engagement and disengagement of a clutch CL.

For example, the first input shaft IP1 and the second input shaft IP2 may be may be coaxially disposed, and the second input shaft IP1 may be a hollow shaft so that the first input shaft IP1 is inserted in the second input shaft IP2.

The clutch CL may be disposed at a first end, which is relatively adjacent to the engine E, of the second input shaft IP2. Further, the engine E is coupled to a first end of the first input shaft IP1 directly or through a damper so that the first input shaft IP1 can be continuously rotated by the power from the engine E.

The first countershaft CNT1 and the second countershaft CNT2 are arranged in parallel with the second input shaft IP2, in which pre-engaging gear pairs are engaged, thereby configuring the pre-engaging mechanism 2.

In detail, the pre-engaging mechanism 1 includes a plurality of pre-engaging pairs engaged with the first input shaft IP2, the first countershaft CNT1, and the second countershaft CNT2 such that pre-engaging pairs suitable for driving speeds are selected by a clutch unit.

For example, a specific gear ratio may be made by selecting one pre-engaging gear pair by a clutch unit disposed between two pre-engaging pairs. The clutch unit may be any kind of clutch unit for connecting or disconnecting power such as a synchro-mesh synchronizer, a dog clutch, a modified dog clutch, a dry/wet clutch, an electric/electronic dry/wet magnet clutch, a coupling, a fluid coupling, and a spline.

The first countershaft CNT1 and the second countershaft CNT2 are arranged in parallel with the third input shaft IP3, in which synchro-engaging gear pairs engaged, thereby configuring the synchro-engaging mechanism 3.

In detail, the synchro-engaging mechanism 3 includes a plurality of synchro-engaging gear pairs engaged with the third input shaft IP3, the first countershaft CNT1, and the second countershaft CNT2 such that synchro-engaging pairs suitable for driving speeds are selected by a clutch unit.

For example, a specific gear ratio may be made by selecting one synchro-engaging gear pair by a clutch unit disposed between two synchro-engaging pairs. The clutch unit may be any kind of clutch unit for connecting or disconnecting power such as a synchro-mesh type synchronizer, a dog clutch, a modified dog clutch, a dry/wet clutch, an electric/electronic dry/wet magnet clutch, a coupling, a fluid coupling, and a spline.

The one-way clutch OWC may be disposed on a corresponding power transmission path so that power transmitted from the engine E through the first input shaft IP1 is transmitted only to the third input shaft IP3.

The one-way clutches OWC mechanically connecting or disconnecting power may be a mechanical device operating in a same principle, a hydraulic part or a hydraulic-mechanical composite device, or a device using electric/electromagnetic force.

The main shifting mechanism 5 includes a plurality of main gear pairs G1~G7, and GR engaged with the first countershaft CNT1, the second countershaft CNT2, and an output shaft OP, in which main gear pairs G1~G7 and GR suitable for driving speeds may be selected by a clutch unit.

That is, while shifting to a desired gear stage is performed, the one-way clutch OWC absorbs the difference in rotational speed at the point of time when the torque from the synchro-engaging gear pairs is switched to the pre-engaging gear pairs due to the difference in gear ratio of the gear stages, thereby preventing poor shifting that causes a phenomenon including pulling of the vehicle during shifting.

Meanwhile, referring to FIG. 1, the pre-engaging gear pairs may include a 1-1 pre-engaging gear pair Ga1-1 and a 2-1 pre-engaging gear pair Ga2-1 engaged with the second input shaft IP2 and the first countershaft CNT1, and a 1-2 pre-engaging gear pair Ga1-2 and a 2-2 pre-engaging gear pair Ga2-2 engaged with thee second input shaft IP2 and the second countershaft CNT2.

The 1-1 pre-engaging gear pair Ga1-1 and the 1-2 pre-engaging gear pair Ga1-2 may be engaged through an input gear, while the 2-1 pre-engaging gear pair Ga2-1 and the 2-2 pre-engaging gear pair Ga2-2 may be engaged through an input gear. The input gears may be formed integrally with the second input shaft IP2 and output gears thereof can rotate relative to the first countershaft CNT1 and the second countershaft CNT2, respectively.

Further, as a clutch unit of the pre-engaging mechanism 1, a first pre-engaging clutch unit Sa1 is disposed between the output gear of the 1-1 pre-engaging gear pair Ga1-1 and the output gear of the 2-1 pre-engaging gear pair Ga2-1, so one of the 1-1 pre-engaging gear pair Ga1-1 and the 2-1 pre-engaging gear pair Ga2-1 can be selected. Further, a second pre-engaging clutch unit Sa2 is disposed between the output gear of the 1-2 pre-engaging gear pair Ga1-2 and the output gear of the 2-2 pre-engaging gear pair Ga2-2, so one of the 1-2 pre-engaging gear pair Ga1-2 and the 2-2 pre-engaging gear pair Ga2-2 can be selected.

Further, the synchro-engaging gear pairs may include a 1-1 synchro-engaging gear pair Gb1-1 and 2-1 synchro-engaging gear pair Gb2-1 engaged with the third input shaft IP3 and the first countershaft CNT1, and a 1-2 synchro-engaging gear pair Gb1-2 and a 2-2 synchro-engaging gear pair Gb2-2 engaged with the third input shaft IP3 and the second countershaft CNT2.

The 1-1 synchro-engaging gear pair Gb1-1 and the 1-2 synchro-engaging gear pair Gb1-2 may be engaged through an input gear, while the 2-1 synchro-engaging gear pair Ga2-1 and the 2-2 synchro-engaging gear pair Ga2-2 may be engaged through an input gear. The input gears may be formed integrally with the third input shaft IP3 and output gears thereof can rotate relative to the first countershaft CNT1 and the second countershaft CNT2, respectively.

Further, as a clutch unit of the synchro-engaging mechanism 3, a first synchro-clutch unit Sb1 is disposed between the output gear of the 1-1 synchro-engaging gear pair Gb1-1 and the output gear of the 2-1 synchro-engaging gear pair Gb2-1, so one of the 1-1 synchro-engaging gear pair Gb1-1 and the 2-1 synchro-engaging gear pair Gb2-1 can be selected. Further, a second synchro-clutch unit Sb2 is disposed between the output gear of the 1-2 synchro-engaging gear pair Gb1-2 and the output gear of the 2-2 synchro-engaging gear pair Gb2-2, so one of the 1-2 synchro-engaging gear pair Gb1-2 and the 2-2 synchro-engaging gear pair Gb2-2 can be selected.

In, in an exemplary embodiment of the present invention, the pre-engaging gear pairs and the synchro-engaging gear pairs have gear pairs having same gear ratios.

For example, the 1-1 pre-engaging gear pair Ga1-1, the 1-2 pre-engaging gear pair Ga1-2, the 1-1 synchro-engaging gear pair Gb1-1, and the 1-2 synchro-engaging gear pair Gb1-2 may be given a same gear ratio, and the 2-1 pre-engaging gear pair Ga2-1, the 2-2 pre-engaging gear pair Ga2-2, the 2-1 synchro-engaging gear pair Gb2-1, and the 2-2 synchro-engaging gear pair Gb2-2 may be given a same gear ratio.

Alternatively, the 1-1 pre-engaging gear pair Ga1-1, the 2-1 pre-engaging gear pair Ga2-1, the 1-1 synchro-engaging gear pair Gb1-1, and the 2-1 synchro-engaging gear pair Gb2-1 may be given a same gear ratio, and the 1-2 pre-engaging gear pair Ga1-2, the 2-2 pre-engaging gear pair Ga2-2, the 1-2 synchro-engaging gear pair Gb1-2, and the 2-2 synchro-engaging gear pair Gb2-2 may be given a same gear ratio.

Alternatively, the 1-1 pre-engaging gear pair Ga1-1 the 1-1 synchro-engaging gear pair Gb1-1 may be given a same gear ratio, the 1-2 pre-engaging gear pair Ga1-2 and the 1-2 synchro-engaging gear pair Gb1-2 may be given a same gear ratio, the 2-1 pre-engaging gear pair Ga2-1 and the 2-1 synchro-engaging gear pair Gb2-1 may be given a same gear ratio, and the 2-2 pre-engaging gear pair Ga2-2 and the 2-2 synchro-engaging gear pair Gb2-2 may be given a same gear ratio.

Further, according to an exemplary embodiment of the present invention, the first input shaft IP1 and the third input shaft IP3 are coaxially arranged and the one-way clutch OWC may be disposed on the power transmission path between the first input shaft IP1 and the third input shaft IP3.

In detail, a power transmission member TG may be disposed at a second end of the first input shaft IP1 to face a first end of the third input shaft IP3, and the one-way clutch OWC may be disposed between power transmission member TG and the third input shaft IP3.

That is, the outer circumference of the one-way clutch may be fixed to the power transmission member TG and the inner circumference of the one-way clutch OWC may be fixed to the end, which faces the power transmission member TG, of the third input shaft IP3.

According to an exemplary embodiment of the present invention, the output shaft OP may be arranged in parallel with the first countershaft CNT1 and the second countershaft CNT and engaged with the main gear pairs G1~G7 and GR. Further, the output shaft OP may be arranged coaxially with the input shafts.

Further, though not shown in the figures, the output from the output shaft OP may be increased or decreased in speed through another gear pair, a planetary gear set, or other transmission elements and then transmitted to wheels.

For example, the input gears of main gears for odd-numbered gear stages or even-numbered gear stages may be disposed on the first countershaft CNT1 and the input gears of the other main gears except for the main gears on the first countershaft CNT1 may be disposed on the second countershaft CNT2.

Accordingly, output gears that make pairs with the input gears on the first countershaft CNT1 and the second countershaft CNT2 may be disposed on the output shaft OP.

Referring to FIG. 1, in detail, when the input gears of the main gear pairs G1, G3, G5, and G7 for the first, third, fifth, and seventh gear stages are disposed on the first countershaft CNT1, the input gears of the main gear pairs G2, G4, G6, and GR for the second, fourth, sixth, and reverse gear stages may be disposed on the second countershaft CNT2 and the output gears of the main gears G1~G7 and GR may be disposed on the output shaft OP.

A 1&3 gear stage clutch unit S1&3 may be disposed between the first gear stage input gear and a third gear stage input gear, a 5&7 gear stage clutch unit S5&7 may be disposed between the fifth gear stage input gear and the seventh gear stage input gear, a 2&4 gear stage input clutch S2&4 may be disposed between the second gear stage input gear and the fourth gear stage input gear, and a 6&R gear stage clutch unit S6&R may be disposed between the sixth gear stage input gear and the R-gear stage input gear.

However, the present invention is not limited to this arrangement of main gear pairs and clutch units and the arrangement may be changed in various ways in accordance with a requirement for designing the transmission, when necessary.

Shifting relationships among a gear stages by the transmission of the present invention are described hereafter. Further, it is assumed in the following example that the 1-1 pre-engaging gear pair Ga1-1, the 1-2 pre-engaging gear pair Ga1-2, the 1-1 synchro-engaging gear pair Gb1-1, and the 1-2 synchro-engaging gear pair Gb1-2 have a same gear ratio, and the 2-1 pre-engaging gear pair Ga2-1, the 2-2 pre-engaging gear pair Ga2-2, the 2-1 synchro-engaging gear pair Gb2-1, and the 2-2 synchro-engaging gear pair Gb2-2 have a same gear ratio.

Referring to FIGS. 1 and 2, when the vehicle starts to be driven in the first gear stage from the neutral gear stage, the 1-1 pre-engaging gear pair Ga1-1 is selected by the first pre-engaging clutch unit Sa1 and the first gear stage main gear pair G1 is selected and engaged by the 1&3 gear stage clutch unit S1&3.

When the clutch CL is engaged in this state, torque starts to be transmitted to the second input shaft IP2 from the engine E and is transmitted to the first countershaft CNT1 through the 1-1 pre-engaging gear pair Ga1-1. Accordingly, the vehicle can be driven in the first gear stage engaged by the first gear stage main gear pair G1 on the first countershaft CNT1 and the output shaft OP.

Further, the 1-1 synchro-engaging gear pair Gb1-1 is selected and engaged by the first synchro-engaging clutch unit Sb1. Since the 1-1 pre-engaging gear pair Ga1-1 and the 1-1 synchro-engaging gear pair Gb1-1 have a same gear ratio, they can rotate together without interlocking.

Next, it is possible to disengage the clutch CL and the first pre-engaging clutch unit Sa1, depending on the driving situation of the vehicle. However, even when the clutch CL and the first pre-engaging clutch unit Sa1 are disengaged, the first input shaft IP1 is rotated while pulling the third input shaft IP3 by the one-way clutch OWC. Accordingly, the power from the engine E keeps being transmitted to the output shaft OP through the 1-1 synchro-engaging gear pair Gb1-1, so the vehicle can keep being driven in the first gear stage by the power from the engine E.

Further, to shift up to the second gear stage from the first gear stage, when the clutch CL and the first pre-engaging clutch unit Sa1 have been disengaged, as described above, the 1-2 pre-engaging gear pair Ga1-2 is selected by the second pre-engaging clutch unit Sa2 and the second main gear pair G2 is selected and engaged by the 2&4 clutch unit S2&4.

When the clutch CL is engaged in this state, torque starts to be transmitted to the second input shaft IP2 from the engine E and is transmitted to the second countershaft CNT2 through the 1-2 pre-engaging gear pair Ga1-2. Accordingly, the vehicle can be driven in the second gear stage engaged by the second gear stage main gear pair G2 on the second countershaft CNT2 and the output shaft OP.

In particular, at the moment of engaging the clutch, the rotational speed transmitted to the first input shaft IP1 through the 1-2 pre-engaging gear pair Ga1-2 with the gear ratio of the second gear stage main gear pair G2 is larger than the rotational speed transmitted to the third input shaft IP3 through the 1-1 synchro-engaging gear pair Gb1-1 with the gear ratio of the first gear stage main gear pair G1. The difference between the rotational speeds is absorbed by the one-way clutch OWC, thereby preventing interlocking.

Accordingly, when shifting is performed from the first gear stage to the second gear stage, the flow of torque transmitted to the first countershaft CNT1 through the 1-1 synchro-engaging gear pair Gb1-1 smoothly changes to the second countershaft CNT2 through the 1-2 pre-engaging gear pair Ga1-2 by the relative rotation of the one-way clutch OWC, so poor shifting such as pulling of a vehicle is prevented.

Further, the 1-2 synchro-engaging gear pair Gb1-2 is selected and engaged by the second synchro-engaging clutch unit Sb2. Since the 1-2 pre-engaging gear pair Ga1-2 and the 1-2 synchro-engaging gear pair Gb1-2 have a same gear ratio, they can rotate together without interlocking.

Next, it is possible to disengage the clutch CL and the second pre-engaging clutch unit Sa2, depending on the driving situation of the vehicle. However, even when the clutch CL and the second pre-engaging clutch unit Sa2 are disengaged, the first input shaft IP1 is rotated while pulling the third input shaft IP3 by the one-way clutch OWC. Accordingly, the power from the engine E is transmitted to the output shaft OP through the 1-2 synchro-engaging gear pair Gb1-2, so the vehicle can keep being driven in the second gear stage by the power from the engine E.

Further, up-shifting to the other gear stages can be performed in this way, so shifting can be stably performed to all gear stages without shifting shock.

As described above, while shifting to a desired gear stage from the current gear stage is performed, the one-way clutch OWC absorbs the difference in rotational speed due to the difference in gear ratio of the gear stages at the point of time when the torque from the synchro-engaging gear pairs is switched to the pre-engaging gear pairs, thereby preventing poor shifting that causes a phenomenon including pulling of the vehicle during shifting.

In, the pre-engaging gear pairs and the synchro-engaging gear pairs have a plurality of stages having different gear ratios, whereby the number of gear stages that can be achieved by combination with the main gear pairs is greatly increased in proportion to the number of stages of the pre-engaging gear pairs and the synchro-engaging gear pairs. Accordingly, it is possible to achieve many gear stages from the transmission without largely increasing the entire length of the transmission.

On the other hand, referring to FIGS. 1 and 3, down-shifting can be performed by single clutch shifting using the pre-engaging gear pairs, but in this case, the torque disconnection period is relatively increased in a process of shifting. Accordingly, it is possible to minimize the torque disconnection period during down-shifting by using the pre-engaging gear pairs and the synchro-engaging gear pairs.

For example, when down-shifting from the third gear stage to the second gear stage is performed, the 1-1 pre-engaging gear pair Ga1-1 is previously selected by the first pre-engaging clutch unit Sa1 and the third main gear pair G3 is previously selected by the 1&3 gear stage clutch unit S1&3 in the current gear stage, so power from the engine E is transmitted to the output shaft OP through the clutch CL.

In this state, the 1-1 synchro-engaging gear pair Gb1-1 is selected and disengaged by the first synchro-engaging clutch unit Sb1 and then, the clutch CL is disengaged and the 1-1 pre-engaging gear pair Ga1-1 is engaged by the first pre-engaging clutch unit Sa1.

However, even when the clutch CL and the first pre-engaging clutch unit Sa1 are disengaged, the first input shaft IP1 is rotated while pulling the third input shaft IP3 by the one-way clutch OWC. Accordingly, the power from the engine E keeps being transmitted to the output shaft OP through the 1-1 synchro-engaging gear pair Gb1-1, so the vehicle can keep being driven in the third gear stage by the power from the engine E.

Next, the 1-2 pre-engaging gear pair Ga1-2 is selected by the pre-engaging clutch unit Sa2 and the second gear stage main gear pair G2 is selected and engaged by the 2&4 gear stage clutch unit S2&4.

Further, the 1-1 synchro-engaging gear pair Gb1-1 is disengaged by the first synchro-engaging clutch unit Sb1, whereby torque is transmitted to the second countershaft CNt2 through the 1-2 pre-engaging gear pair Ga1-2. Accordingly, the vehicle can be driven in the second gear stage engaged by the second gear stage main gear pair G2 on the second countershaft CNT2 and the output shaft OP.

That is, the power from the engine E is continuously transmitted to the output shaft OP until the desired gear stage is pre-engaged such that the vehicle is driven in the previous gear stage, and the power is for a predetermined time disconnected only right before the clutch CL is engaged at the last stage of shifting, whereby the torque disconnection period during down-shifting is minimized. Accordingly, it is possible to minimize disconnection during shifting in the vehicle and thus the riding comfort is improved, thereby improving the commercial value of the vehicle.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission for a vehicle, the transmission comprising:
    a first input shaft continuously receiving power from an engine;
    a second input shaft selectively receiving power from the engine through a clutch;
    a first countershaft and a second countershaft arranged in parallel with the second input shaft;
    a pre-engaging mechanism including a plurality of pre-engaging gear pairs engaged with the second input shaft and the first countershaft, and the second input shaft and the second countershaft so that the pre-engaging gear pairs are selected by a clutch unit in accordance with a driving speed;
    a third input shaft arranged in parallel with the first countershaft and the second countershaft;
    a synchro-engaging mechanism including a plurality of synchro-engaging gear pairs engaged with the third input shaft and the first countershaft, and the third input shaft and the second countershaft so that the synchro-engaging gear pairs are selected by a clutch unit in accordance with a driving speed;
    a one-way clutch positioned on a corresponding power transmission path so that power transmitted through the first input shaft from the engine is transmitted directly to the third input shaft; and
    a main shifting mechanism including a plurality of main gear pairs engaged with the first countershaft and an output shaft, and the second countershaft and the output shaft so that the main gear pairs are selected by a clutch unit in accordance with a driving speed.

2. The transmission of claim 1, wherein the first input shaft and the second input shaft are coaxially arranged,
    the second input shaft is a hollow shaft and the first input shaft is inserted in the second input shaft, and
    the clutch is positioned at a first end, which is relatively adjacent to the engine, of the second input shaft.

3. The transmission of claim 1, wherein the pre-engaging gear pairs include: a 1-1 pre-engaging gear pair and a 2-1 pre-engaging gear pair engaged with the second input shaft and the first countershaft; and a 1-2 pre-engaging gear pair and a 2-2 pre-engaging gear pair engaged with the second input shaft and the second countershaft, and
    the synchro-engaging gear pairs include: a 1-1 synchro-engaging gear pair and a 2-1 synchro-engaging gear pair engaged with the third input shaft and the first countershaft; and a 1-2 synchro-engaging gear pair and a 2-2 synchro-engaging gear pair engaged with the third input shaft and the second countershaft.

4. The transmission of claim 3, wherein the pre-engaging gear pairs and the synchro-engaging gear pairs have gear pairs having same gear ratios.

5. The transmission of claim 4, wherein the 1-1 pre-engaging gear pair, the 1-2 pre-engaging gear pair, the 1-1 synchro-engaging gear pair, and the 1-2 synchro-engaging gear pair have the same gear ratio, and
    the 2-1 pre-engaging gear pair, the 2-2 pre-engaging gear pair, the 2-1 synchro-engaging gear pair, and the 2-2 synchro-engaging gear pair have a same gear ratio.

6. The transmission of claim 4, wherein the 1-1 pre-engaging gear pair, the 2-1 pre-engaging gear pair, the 1-1 synchro-engaging gear pair, and the 2-1 synchro-engaging gear pair have the same gear ratio, and
    the 1-2 pre-engaging gear pair, the 2-2 pre-engaging gear pair, the 1-2 synchro-engaging gear pair, and the 2-2 synchro-engaging gear pair have a same gear ratio.

7. The transmission of claim 4, wherein the 1-1 pre-engaging gear pair and the 1-1 synchro-engaging gear pair have a same gear ratio, the 1-2 pre-engaging gear pair and the 1-2 synchro-engaging gear pair have a same gear ratio, the 2-1 pre-engaging gear pair and the 2-1 synchro-engaging gear pair have a same gear ratio, and the 2-2 pre-engaging gear pair and the 2-2 synchro-engaging gear pair have a same gear ratio.

8. The transmission of claim 1, wherein the clutch unit of the pre-engaging mechanism is positioned between a plurality of pre-engaging gear pairs and selects a pre-engaging gear pair in accordance with a driving speed, and the clutch unit of the synchro-engaging mechanism is positioned between a plurality of synchro-engaging gear pairs and selects a synchro-engaging gear pair in accordance with a driving speed.

9. The transmission of claim 1, wherein the first input shaft and the third input shaft are coaxially arranged, and the one-way clutch is positioned on a power transmission path connected from the first input shaft to the third input shaft.

10. The transmission of claim 9, wherein a power transmission member is positioned at an end of the first input shaft to face a first end of the third input shaft and the one-way clutch is positioned between the power transmission member and the third input shaft.

11. The transmission of claim 1, wherein input gears of main gear pairs for odd-numbered gear stages or even-numbered gear stages are positioned on the first countershaft, input gears of the other main gear pairs except for the input gears on the first countershaft are positioned on the second countershaft, and output gears making pairs with the input gears on the first countershaft and the second countershaft are positioned on the output shaft.

\* \* \* \* \*